US008718894B2

(12) United States Patent
Schriefer et al.

(10) Patent No.: US 8,718,894 B2
(45) Date of Patent: May 6, 2014

(54) FUNCTION SECURING UNIT FOR COMMUNICATION SYSTEMS

(75) Inventors: Jörn Schriefer, Griesheim (DE); Jürgen Scherschmidt, Frankfurt (DE); Thomas Peichl, Wöllstadt (DE)

(73) Assignee: Continental Teves AG & Co. oHG (DE)

( * ) Notice: Subject to any disclaimer, the term of this patent is extended or adjusted under 35 U.S.C. 154(b) by 318 days.

(21) Appl. No.: 13/146,772

(22) PCT Filed: Feb. 3, 2010

(86) PCT No.: PCT/EP2010/051322
§ 371 (c)(1),
(2), (4) Date: Aug. 15, 2011

(87) PCT Pub. No.: WO2010/089331
PCT Pub. Date: Aug. 12, 2010

(65) Prior Publication Data
US 2011/0296433 A1 Dec. 1, 2011

(30) Foreign Application Priority Data
Feb. 3, 2009 (DE) .......................... 10 2009 007 200

(51) Int. Cl.
*G06F 7/00* (2006.01)
(52) U.S. Cl.
USPC .................................. 701/76; 701/70; 701/71
(58) Field of Classification Search
None
See application file for complete search history.

(56) References Cited

U.S. PATENT DOCUMENTS

| 5,404,304 | A | * | 4/1995 | Wise et al. ..................... 700/304 |
| 5,463,551 | A | * | 10/1995 | Milunas ........................... 701/91 |
| 5,748,923 | A | | 5/1998 | Eitrich |
| 6,768,966 | B2 | * | 7/2004 | Ohle et al. ..................... 702/165 |
| 7,096,108 | B2 | * | 8/2006 | Nilsson et al. .................... 701/70 |
| 8,000,855 | B2 | * | 8/2011 | Bauerle et al. ................ 701/33.6 |
| 2003/0125852 | A1 | * | 7/2003 | Schade et al. .................... 701/29 |
| 2005/0055469 | A1 | | 3/2005 | Scheele |
| 2006/0080023 | A1 | * | 4/2006 | Hrovat et al. .................... 701/82 |
| 2008/0071880 | A1 | | 3/2008 | Katoh |

(Continued)

FOREIGN PATENT DOCUMENTS

DE 4408488 A1 9/1995
DE 10333932 A1 2/2005

(Continued)

OTHER PUBLICATIONS

German Search Report dated Jun. 24, 2011.
International Search Report issued in PCT/EP2010/051322 filed Feb. 3, 2010, mailed May 7, 2010.

*Primary Examiner* — Helal A Algahaim
*Assistant Examiner* — Donald J Wallace
(74) *Attorney, Agent, or Firm* — RatnerPrestia

(57) ABSTRACT

A communication system having at least one first and a second communication unit. The first communication unit has a counter memory unit which stores a counter value, and is designed such that the occurrence of a first communication event prompts the counter value in the counter memory unit to be changed in a defined first manner. At least the occurrence of a defined reference event is followed by the counter value in the counter memory unit being changed in a defined second manner. In the course of a second defined communication event, the first communication unit transmits the current counter value in the counter memory unit to the second communication unit.

11 Claims, 2 Drawing Sheets

(56) References Cited

U.S. PATENT DOCUMENTS

| | | | |
|---|---|---|---|
| 2009/0043483 A1* | 2/2009 | Abe et al. | 701/105 |
| 2010/0222983 A1* | 9/2010 | Berr | 701/102 |
| 2011/0029208 A1* | 2/2011 | Xia | 701/58 |
| 2011/0130900 A1* | 6/2011 | Fuchs et al. | 701/22 |

FOREIGN PATENT DOCUMENTS

| | | |
|---|---|---|
| DE | 10 2005 045 918 A1 | 3/2007 |
| DE | 10 2005 048 547 A1 | 4/2007 |
| EP | 1768317 A2 | 3/2007 |

* cited by examiner

FUNCTION SECURING UNIT FOR COMMUNICATION SYSTEMS

CROSS REFERENCE TO RELATED APPLICATIONS

This application is the U.S. National Phase Application of PCT International Application No. PCT/EP2010/051322, filed Feb. 3, 2010, which claims priority to German Patent Application No. 10 2009 007 200.4, filed Feb. 3, 2009, the contents of such applications being incorporated by reference herein.

FIELD OF THE INVENTION

The invention relates to a communication system to a method for synchronization and to the use of the communication system in motor vehicles.

BACKGROUND OF THE INVENTION

The inventors sought to develop a communication system and the method for synchronization which allows synchronous communication between at least two communication units in a relatively inexpensive manner and/or which allows a relatively high level of system security for communication between communication units in the system.

SUMMARY OF THE INVENTION

This is achieved by means of a communication system having at least one first and a second communication unit, wherein the first communication unit has a counter memory unit which stores a counter value (MSG_CNT), wherein the first communication unit is designed such that at least the occurrence of a first defined communication event prompts the counter value in the counter memory unit to be changed in at least one defined first manner, wherein at least the occurrence of a defined reference event is followed by the counter value in the counter memory unit being changed in at least one defined second manner, wherein at least in the course of a second defined communication event the first communication unit transmits the current counter value in the counter memory unit directly or indirectly to the second communication unit. The invention also achieves this by means of a method for synchronizing the communication between at least one first and a second communication unit in a communication system wherein the first communication unit has a counter memory unit which stores a counter value (MSG_CNT), wherein the occurrence of a first defined communication event prompts the counter value in the counter memory unit to be changed in at least one defined first manner, and wherein the occurrence of a defined reference event prompts the counter value in the counter memory unit to be changed in at least one defined second manner, wherein at least in the course of a second defined communication event the first communication unit transmits at least the current counter value (MSG_CNT) in the counter memory unit directly or indirectly to the second communication unit.

The communication system and the method are designed particularly to increase dependability in an electronic system.

The term dependable is preferably understood to mean the term "fail safe" and/or "fail silent".

The description for the occurrence is preferably understood to mean after the occurrence.

The first and second communication events are preferably defined as a communication event which occurs or can occur at least in the communication between the first and second communication units.

The counter memory unit is preferably designed such, and/or is preferably actuated such, that the change in the counter value in the defined first manner is effected by a defined step size using a mathematical operation. The mathematical operation is understood to mean particularly addition or multiplication or a more complex operation, and the step size is understood to mean, by way of example, the value by which the counter value is incremented or decremented, with particular preference by the value one, or the value which is multiplied by the counter value.

The counter memory unit is preferably designed such, and/or is actuated such, that every communication event between communication units in the communication system, such as the first and second communication units, prompts the counter value in the counter memory unit to be changed in the defined first manner. With particular preference, the first communication event is defined such that every communication event between communication units in the communication system is handled at least as the defined first communication event.

It is preferred that the counter memory unit is designed and/or actuated as a counter unit, wherein the change in the counter value in the defined second manner is in the form of a set operation or reset operation for the counter unit. This set or reset operation prompts the counter value to be reset particularly to a defined value, with particular preference the value "0".

The first communication unit preferably has at least one first and a second data memory unit and is designed such that at least the occurrence of the first defined communication event prompts the current data item in the first data memory unit to be written to the second data memory unit and prompts the counter value in the counter memory unit to be changed in the defined first manner. By way of example, this is based on the form for a special mode of operation called a continuous mode of operation or "continuous mode", in which the counter value in the counter memory unit is with particular preference not reset.

As an alternative preference, the first communication unit has at least one first and a second data memory unit and is designed such that the occurrence of a defined trigger event, particularly a defined third communication event or an internal trigger event, is followed by the current data item in the first data memory unit being written to the second data memory unit and, with particular preference thereafter, the counter value in the counter memory unit being changed in the defined second manner. With quite particular preference, the writing of the current data item in the first data memory unit to the second data memory unit is followed by the then stored data in the first and second data memory units being compared in a transfer unit. The comparison result from this comparison is used further as status information.

It is preferred that the first communication unit is designed such that in the course of at least the second defined communication event between at least the first and second communication units the current data item in the second data memory unit is transmitted from the first communication unit to the second communication unit.

It is expedient that the second communication unit is designed as a master unit and at least the first communication unit is designed as a slave unit, and these units are connected to one another by a bus system.

The first communication unit is preferably designed as a sensor unit and/or actuator unit which, in particular, captures at least one measured variable and provides at least one measured variable data item.

The second communication unit is preferably designed as an electronic control unit, particularly as an electronic control unit in a motor vehicle braking system and/or in a motor vehicle electronic stability control system.

It is preferred that the counter memory unit is designed and actuated such that the counter value is designed to be able to be used as a time stamp and/or that the counter value forms or provides a time measure for synchronizing the communication system.

The reference event is preferably defined as the, in particular successful, operation of writing the data item in the first data memory unit to the second data memory unit.

The third defined communication event is preferably defined as a data query or "sample command" from the second communication unit at least to the first communication unit, particularly to all further communication units in the communication system.

The internal trigger event is preferably defined as the transgression above or below a measured value or parameter in the first communication unit.

The second defined communication event expediently comprises data access by the second communication unit at least to the first communication unit, which involves the current counter value and the data item currently stored in the second data memory unit being transmitted or sent, in particular together, from the first communication unit to the second communication unit.

It is preferred that the first communication unit is designed as a sensor and/or actuator unit and has at least one first status information processing module which comprises a status memory unit which stores a status information item for this first communication unit in the form of a status data item, wherein the first status information processing module furthermore comprises a masking memory unit, connected to the status memory unit, and also a status processing element which is connected to this masking memory unit, wherein the first status information processing module is designed such that at least one status information item from the status data item is selected by the masking memory unit and the resulting selective status data item is processed by the status processing element such that the output of said masking memory unit provides a short status data item, which has a shorter data word length than the selective status data item.

The masking memory unit preferably comprises a logic circuit or a selection circuit which is used to link the status data item at the input to the bit mask stored in the masking memory unit, as a result of which the selective status data item is produced. This logic circuit or selection circuit particularly comprises an AND logic circuit which, with particular preference, is designed such that each bit of the status data item is ANDed with a respective bit from the bit mask.

Preferably, the first status information processing module additionally has a short status memory unit which is connected to the status processing element and to which the short status data item is written.

The first communication unit preferably comprises an interface unit which is connected to the output of the status processing element or to the output of the short status memory unit in the first status information processing module and is connected to the masking memory unit in the first status information processing module such that it can change and/or overwrite the bit mask stored in the masking memory unit, as a result of which it is possible to customize the selection of the status types which are used to provide the interface unit with information in the form of the short status data.

Alternatively, the short status memory unit is preferably integrated in the interface unit.

It is preferred that the interface unit is furthermore connected to the status memory unit in at least the first status information processing module in such a way, and is designed in such a way, that it can write to this status memory unit, as a result of which it is possible for a test status data item to be written to the status memory unit. For this purpose, the interface unit particularly has a test unit which is designed such that it automatically provides test data or forwards and/or processes test data, with particular preference test data which are provided by a second communication unit.

Expediently or alternatively, the communication unit preferably has at least one signal processing unit which produces and/or provides particularly a test module in addition or as an alternative to the test unit in the interface module.

Preferably, the first communication unit additionally has at least one second, redundant status information processing module which is essentially designed on the basis of the first status processing module and is likewise connected to the interface unit essentially in the same way.

The first communication unit is preferably part of a communication system and connected to at least one second communication unit, wherein the interface unit of the first communication unit is designed such that it can transmit the short status data item from the first and/or the second status information processing module and/or a total short status data item, which is derived from one or both of these data items, to the second communication unit. The interface unit of the first communication unit is particularly designed such that it writes a test status data item which has been received from the second communication unit to the status memory unit in the first and/or status information processing module directly or in modified form and then transmits at least one of the short status data items resulting therefrom and/or a total short status data item derived therefrom to the second communication unit.

The expression "the communication unit" itself, that is to say without numbering, expediently always means the first communication unit, which is designed as a sensor and/or actuator unit.

The status memory units in the first and second status information processing modules are expediently connected such, and/or are actuated such, that the respective status data in these two status memory units are, at least in relation to status information which is provided by the communication unit itself, in the form of data words which are the inverse of one another. In particular, the masking memory units in the first and second status information processing modules are connected such, and/or are actuated such, that the respective bit masks in these two masking memory units are in the form of data words which are the inverse of one another.

The method according to the invention is preferably developed by virtue of the first communication unit having at least one first and a second data memory unit, wherein the occurrence of a defined trigger event, particularly a defined third communication event or an internal trigger event, is followed by the current data item in the first data memory unit being written to the second data memory unit and by the counter value in the counter memory unit being changed in the defined second manner, and wherein the occurrence of the defined second communication event is followed by the current data item in the second data memory unit being transmitted or sent at least from the first communication unit to the second communication unit.

Furthermore, the method is expediently developed further by virtue of the transmission of status information from the first communication unit, which is designed as a sensor and/or actuator unit, to at least the second communication unit involving the first communication unit having at least one first status information processing module with a status memory unit which stores status information from said first communication unit in the form of a status data item, wherein at least one status information item from this status data item from the first status information processing module is selected by means of a masking memory unit, after which the resulting selective status data item is processed by a status processing element and this status processing element provides a short status data item, which has a shorter data word length than the selective status data item.

The method for transmitting status information is preferably developed further by virtue of the at least one short status data item being transmitted via an interface unit to the second communication unit. Accordingly, it is particularly preferred that the second communication unit interprets the short status data item regarding whether the short status data item contains an information item indicating that the second communication unit is intended to react thereto, after which, if the presence of such an information item to which the second communication unit is intended to react is identified, the second communication unit requests or reads at least the status data item from the first and/or the second status information processing module and/or the second communication unit automatically puts itself into another mode of operation, particularly into an emergency mode of operation. With quite particular preference, the second communication unit is designed such that it stores information relating to the interpretation of the at least one short status data item and/or the total short status data item.

The invention also relates to the use of the communication system in motor vehicles, particularly in a motor vehicle braking system and/or in a motor vehicle electronic stability control system.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
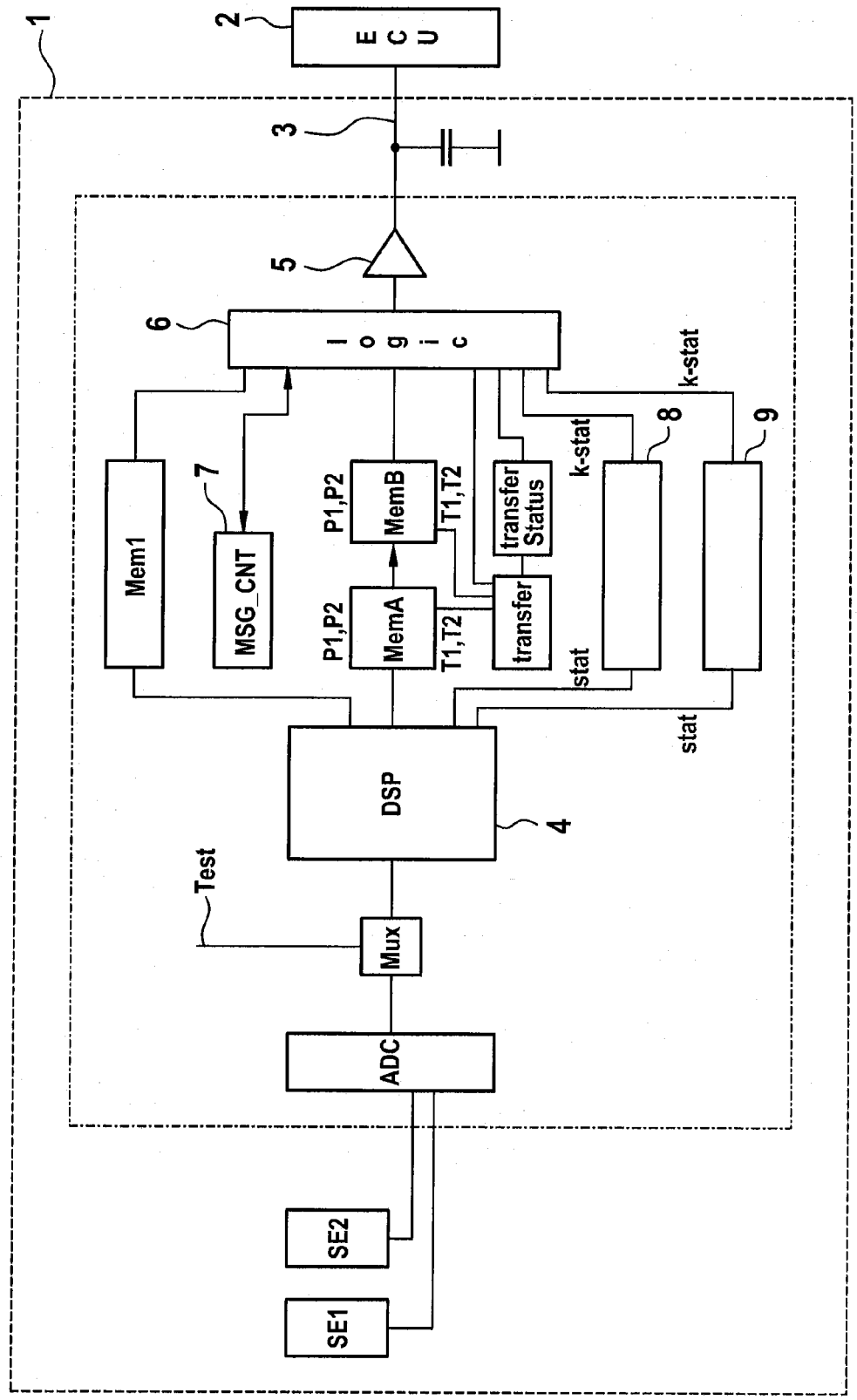
FIG. 1 shows an exemplary embodiment of a communication system with a first and a second communication unit, wherein the first communication unit is designed as a sensor unit and comprises a counter memory unit.

FIG. 1 shows an exemplary dependable communication system, comprising a first communication unit 1, for example designed as a pressure sensor unit, which is connected by means of a data transmission link 3 to a second communication unit 2, which is designed as an electronic control unit ECU. In this case, the sensor unit 1 has two pickups SE1, SE2, for example two pressure sensor elements. These are connected to an analog/digital converter ADC which, by way of example, provides two digital pressure values P1, P2 and two digital temperature values T1, T2 per measurement. This analog/digital converter ADC is connected by means of a multiplexer Mux to a signal processing unit 4, for example designed as a digital signal processor DSP. In addition, the multiplexer Mux is also used to supply at least one further signal line, for example test signal lines TEST to the signal processing unit 4. For the principal information or pressure information P1, P2 which the sensor unit 1 is intended to deliver to the control unit 2, the sensor unit 1 has a first and a second serial data memory unit MemA and MemB for the purpose of synchronization. In this case, for each measurement/evaluation operation or cycle, the principal information, for example two digital pressure values P1, P2 and two digital temperature values T1, T2, is written to the first data memory unit MemA, which is used as buffer store. This always involves the first data memory unit MemA being overwritten. In line with the example, the signal processing unit 4 automatically writes to the first data memory unit MemA when there are new data available.

The sensor unit 1 has a counter memory unit 7 which stores a counter value (message counter) MSG_CNT which corresponds to a time stamp or time measure for synchronous communication within the communication system. At least a first communication event, in line with the example every communication event between the first and second communication units, prompts the counter value to be changed in a defined first manner. In line with the example, this is done by means of actuation by the interface unit "logic", 6. The counter memory unit 7 is designed as a counter unit, and the actuation in the first manner is defined—in line with the example—as incrementation of the counter value by 1.

A data query or a "sample command" from the second communication unit 2, ECU, which, in line with the example, is defined as a third communication event, is interpreted by the sensor unit 1 as a trigger event, on the basis of which the sensor unit 1 transmits or writes the current data item in the first data memory unit MemA to the second data memory unit MemB. Such a successful write operation from MemA to MemB after the trigger event is defined as a reference event, the occurrence of which is followed by the counter value in the counter memory unit 7 or counter unit being changed in a defined second manner, which in line with the example corresponds to the counter value being reset to the value "0". As a result, the query operation by the second communication unit ECU is linked to the reset of the counter value for the purpose of synchronization. There then follows data access or a read command by the second communication unit, for example, which access or command is defined as a second communication event. The data item stored in the second data memory unit MemB and the current counter value are then transmitted from the sensor unit 1 to the control unit ECU, 2. This transmission is effected by the interface unit 'logic', 6, and—in line with the example—the driver unit 5 connected downstream thereof.

The control unit 2 thus triggers the data transmission with the third communication event in order to select the current data at the exact request time in each case—the current data item in the first data memory MemA is written to the second data memory MemB. This data item from MemB is then made available to the driver unit 5 together with the current counter value via the interface unit 6, 'logic', after data access by the ECU, which is defined as a second communication event, and said driver unit transmits these data via the data transmission link 3 to the control unit 2.

The signal processing unit 4 furthermore provides status information stat which is supplied to a first and a redundant second status information processing module 8 and 9, which are connected to the interface unit 'logic', 6. These two status information processing modules 8, 9 allow efficient and resource-saving transmission of status information from the sensor unit 1 to the control unit 2.

The sensor unit 1 additionally has a central memory unit Mem1 which—in line with the example—is designed as an EEPROM unit and which stores defined operating parameters for the sensor unit. This central memory unit Mem1 is likewise connected to the signal processing unit 4 and to the interface unit logic.

In line with the example, the memory units MemA and MemB each comprise a register for each principal information data item P1, P2, T1 and T2.

The central memory unit Mem1 optionally comprises a hardware identification information item ID which the control unit ECU can query and which can be used to explicitly identify the sensor unit 1. This makes it possible to avoid the use of a sensor unit—not provided—in interaction with a particular control unit, for example.

In order to further increase dependability, provision is optionally made for the control unit ECU to compare the pressure values P1 and P2 captured by the pressure sensor elements SE1 and SE2 and provided by the signal processing unit 4 for the purpose of plausibility checking. The analog/digital converter ADC and/or the signal processing unit 4 cannot be ruled out from influencing the pressure signals in a similar, undesirable manner. Therefore, the pressure values P1 and P2 are—in line with the example—represented or encoded in different manners, for example as data with inverse coding relative to one another or by a relative offset which is known to the control unit 2.

Furthermore, at defined times, for example in a test mode of the sensor unit 1, one or more test data items are provided on test signal lines Test and allow the control unit 2 to check whether, by way of example, filter parameters or other signal processing functions of the signal processing unit 4 are working correctly. In line with the example, the control unit 2 prescribes these test values at runtime in each case or initializes a BIST (built-in in self test)—implemented completely in the sensor unit 1—with appropriately stored test vectors or test data, these or the output data associated therewith being known to the control unit 2.

So as to be optionally able to additionally recognize an erroneous select line or the function thereof in the multiplexer Mux, the pressure values P1 and P2 are checked for plausibility in the control unit 2, particularly directly following the processing of test data, for example using a pressure model or using particular threshold values/differential value thresholds.

This plausibility check on at least the pressure values P1 and P2 can be performed by way of example on a "braking system level" when the communication system described here is part of a motor vehicle braking system and the sensor unit 1 captures braking pressure values and the control unit 2 is designed as the electronic control unit of the braking system.

The time base of the time stamp or the respective current counter value is known both to the sensor unit 1 and to the control unit ECU. This time stamp allows possible sample/timing and/or synchronization errors to be recognized, in particular for the data transmission via the data transmission link 3.

By way of example, the data transmission link 3 merely comprises a single data transmission line.

The data memory units MemA, MemB optionally have an associated transfer unit 'transfer' for example, which comprises a logic circuit which is used to compare the data in the memory MemA directly before the transmission of the data in the buffer store MemA to the memory MemB with the data in the memory MemB directly after this very transmission. The result is written to a status register 'transfer Status'. Furthermore, the transfer unit 'transfer' has a test logic circuit which is used to test the logic circuit. In line with the example, the transmission of the data from MemA to MemB and/or the transfer unit is/are additionally checked by the transmission of test data from MemA to MemB.

Figure 2:
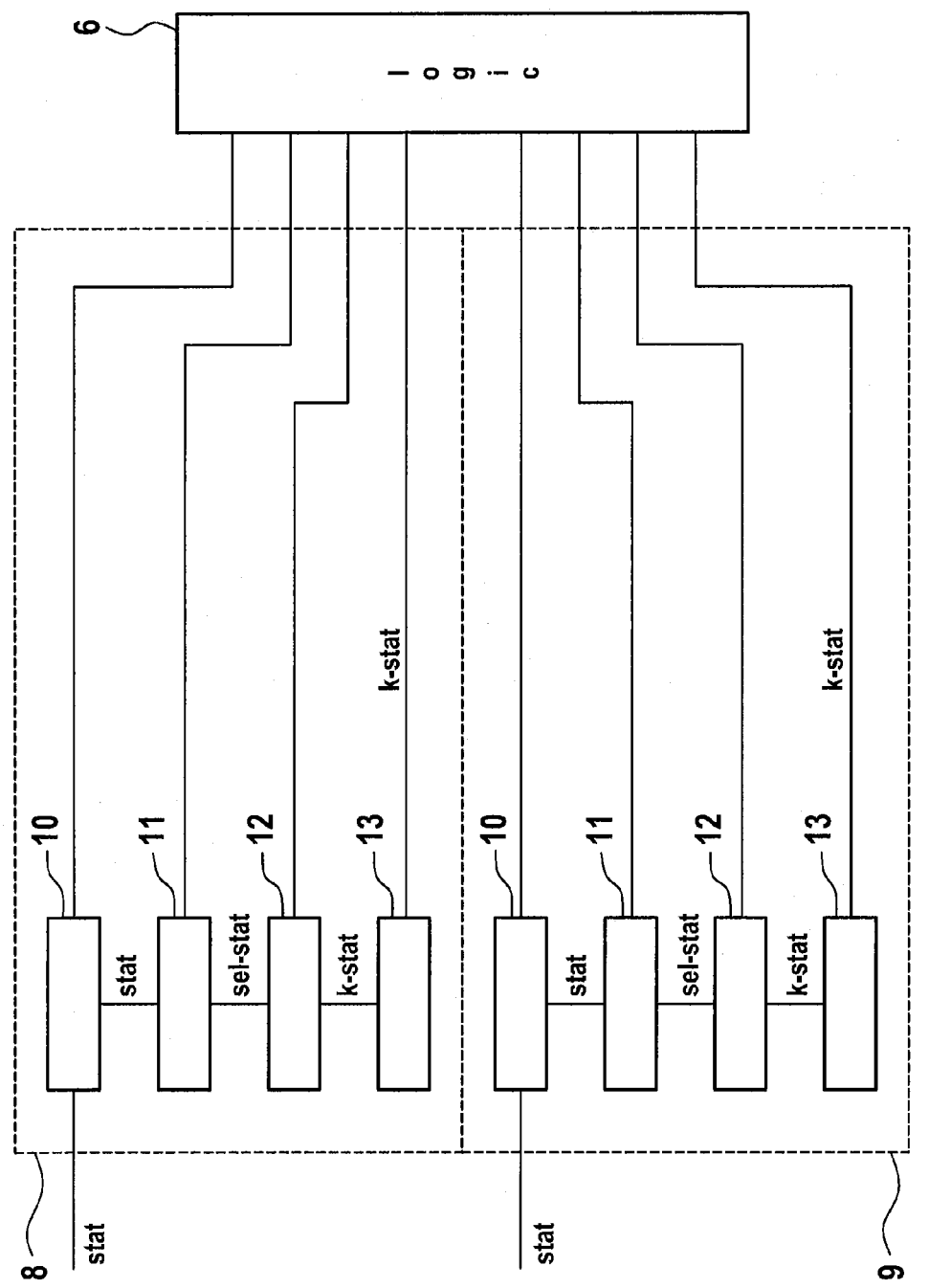
FIG. 2 shows the exemplary form of a first and a second status information processing module and the connection thereof to an interface unit.

FIG. 2 is used to illustrate the design and actuation of the redundant status information processing modules 8 and 9 of the sensor unit. These respectively comprise a status memory unit 10, a masking memory unit 11, a status processing element 12 and, in line with the example, a short status memory unit 13, which is/are alternatively each or jointly integrated in the interface unit 6, 'logic', for example. The status memory unit 10 is supplied with a respective status data item stat, in line with the example by the signal processing unit 4, which is not shown here, and said status data item is stored in the status memory units 10. These make the respective status data item stat available to the masking memory unit 11, which stores a bit mask and in which the status data item stat is ANDed with the respective bit mask, as a result of which the bit mask selects defined status bits or status information. For this purpose, the masking memory unit 11 has a respective logic circuit—not shown—or selection circuit. This logic circuit or selection circuit comprises particularly an AND logic circuit which, in line with the example, is designed such that each bit of the status data item is ANDed with a respective bit of the bit of the bit mask.

The resulting selective status data item sel-stat is processed in the status processing element 12, so that a short status data item k-stat is provided, which has a shorter data word length than the selective status data item sel-stat. In line with the example, the status processing element 12 is designed such that it ORs the individual bits of the selective status data item sel-stat. The short status data item k-stat is stored in the short status memory unit 13 and made available to the interface unit 6. In line with the example, the exemplary ORing of the individual bits of the selective status data item means that the short status data item k-stat comprises only one bit, which contains a piece of information regarding whether one or more, that is to say whether at least one, of the status bits which are selected by the masking memory unit has/have the value "1". The short status data item k-stat in each status information processing module 8, 9 or a common total short status data item is sent to the second communication unit—which is not shown here. If the latter identifies the occurrence of an error or of an undesirable status, the interface unit 6 reads one or both of the status memory units and sends the respective complete status data item to the second communication unit. The interface unit 6 is designed and connected to the masking memory unit 12 such that read and write access are possible. The write access or the changing or writing of the bit mask allows the selection of the individual status bits of the status data item to be prescribed.

By way of example, the interface unit 6 has a test unit—not shown—which is designed such that it automatically provides test data or forwards and/or processes test data, with particular preference test data which are provided by a second communication unit. These test data are respectively written to the status memory unit of the status information processing modules 8, 9 by the interface unit, and the result is assessed with respect to the result that is to be expected. It is thus possible to test the workings of the status information processing modules 8, 9.

As an alternative example, the status information processing modules 8, 9 do not have any short status memory units, but rather the respective short status data item k-stat is made available to the interface unit, which is designed such that it ORs these two short status data items k-stat and produces a total short status data item which is derived therefrom in this manner and which is transmitted to the second communication unit, for example.

The invention claimed is:

1. A communication system having at least a first and a second communication unit, wherein the first communication unit has a counter memory unit which stores a counter value (MSG_CNT), wherein the first communication unit is configured such that at least an occurrence of a first defined communication event prompts the counter value in the counter memory unit to be changed in at least one defined first manner, wherein at least an occurrence of a defined reference event is followed by the counter value in the counter memory unit is changed in at least one defined second manner, wherein at least in the course of a second defined communication event the first communication unit transmits the current counter value in the counter memory unit directly or indirectly to the second communication unit, wherein the first communication unit has at least one first and a second data memory unit (MemA, MemB) and is configured such that at least the occurrence of the first defined communication event prompts a current data item in the first data memory unit (MemA) to be written to the second data memory unit (MemB) and prompts the counter value (MSG_CNT) in the counter memory unit to be changed in the defined first manner.

2. The communication system as claimed in claim 1, wherein the counter memory unit is configured and/or actuated such that the change in the counter value (MSG_CNT) in the defined first manner is effected by a defined step size using a mathematical operation.

3. The communication system as claimed in claim 1, wherein the counter memory unit is configured and/or actuated such that every communication event between the first and second communication units in the communication system prompts the counter value (MSG_CNT) in the counter memory unit to be changed in the defined first manner.

4. The communication system as claimed in claim 1, wherein the counter memory unit is configured and/or actuated as a counter unit, wherein the change in the counter value in the defined second manner is in the form of an operation for setting the counter unit to a defined counter value.

5. The use of the communication system as claimed in claim 1 in motor vehicles.

6. The use of the communication system as claimed in claim 5 in a motor vehicle braking system and/or in a motor vehicle electronic stability control system.

7. A communication system having at least a first and a second communication unit, wherein the first communication unit has a counter memory unit which stores a counter value (MSG_CNT), wherein the first communication unit is configured such that at least an occurrence of a first defined communication event prompts the counter value in the counter memory unit to be changed in at least one defined first manner, wherein at least an occurrence of a defined reference event is followed by the counter value in the counter memory unit is changed in at least one defined second manner, wherein at least in the course of a second defined communication event the first communication unit transmits the current counter value in the counter memory unit directly or indirectly to the second communication unit, wherein the first communication unit has at least one first and a second data memory unit (MemA, MemB) and is configured such that the occurrence of a defined trigger event is followed by a current data item in the first data memory unit (MemA) being written to the second data memory unit (MemB) and by the counter value (MSG_CNT) in the counter memory unit being changed in the defined second manner.

8. The communication system as claimed in claim 7, wherein the defined trigger event is either a defined third communication event or an internal trigger event.

9. The communication system as claimed in claim 7, wherein the first communication unit is configured such that, in the course of at least the second defined communication event between the first and second communication units, a current data item in the second data memory unit (MemB) is transmitted from the first communication unit to the second communication unit.

10. A method for synchronizing communication between at least one first and a second communication unit in a communication system wherein the first communication unit has a counter memory unit which stores a counter value (MSG_CNT), wherein an occurrence of a first defined communication event prompts the counter value in the counter memory unit to be changed in at least one defined first manner and wherein an occurrence of a defined reference event prompts the counter value in the counter memory unit to be changed in at least one defined second manner, wherein, at least in the course of a second defined communication event, the first communication unit transmits at least the current counter value (MSG_CNT) in the counter memory unit directly or indirectly to the second communication unit, wherein the first communication unit has at least one first and a second data memory unit (MemA, MemB), wherein the occurrence of a defined trigger event is followed by a current data item in the first data memory unit (MemA) being written to the second data memory unit (MemB) and by the counter value (MSG_CNT) in the counter memory unit being changed in the defined second manner and wherein an occurrence of the defined second communication event is followed by a current data item in the second data memory unit (MemB) being transmitted at least from the first communication unit to the second communication unit.

11. The method as claimed in claim 10, wherein the defined trigger event is either a defined third communication event or an internal trigger event.

* * * * *

UNITED STATES PATENT AND TRADEMARK OFFICE
CERTIFICATE OF CORRECTION

PATENT NO. : 8,718,894 B2
APPLICATION NO. : 13/146772
DATED : May 6, 2014
INVENTOR(S) : Schriefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this

Twenty-ninth Day of September, 2015

Michelle K. Lee
*Director of the United States Patent and Trademark Office*